United States Patent
Zheng et al.

(10) Patent No.: US 9,632,808 B2
(45) Date of Patent: Apr. 25, 2017

(54) IMPLICIT CO-SCHEDULING OF CPUS

(71) Applicant: VMware, Inc., Palo Alto, CA (US)

(72) Inventors: Haoqiang Zheng, Mountain View, CA (US); Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 176 days.

(21) Appl. No.: 14/273,022

(22) Filed: May 8, 2014

(65) Prior Publication Data

US 2014/0245304 A1 Aug. 28, 2014

Related U.S. Application Data

(62) Division of application No. 13/105,396, filed on May 11, 2011, now Pat. No. 8,752,058.

(60) Provisional application No. 61/333,486, filed on May 11, 2010.

(51) Int. Cl.
*G06F 9/46* (2006.01)
*G06F 9/455* (2006.01)
*G06F 9/48* (2006.01)
*G06F 9/52* (2006.01)

(52) U.S. Cl.
CPC ...... *G06F 9/45533* (2013.01); *G06F 9/45558* (2013.01); *G06F 9/46* (2013.01); *G06F 9/4881* (2013.01); *G06F 9/522* (2013.01)

(58) Field of Classification Search
None
See application file for complete search history.

(56) References Cited

U.S. PATENT DOCUMENTS

| | | |
|---|---|---|
| 6,075,938 A | 6/2000 | Bugnion et al. |
| 6,601,084 B1 | 7/2003 | Bhaskaran et al. |
| 6,996,822 B1 | 2/2006 | Willen et al. |
| 7,036,123 B2 | 4/2006 | Dorofeev et al. |
| 7,167,916 B2 | 1/2007 | Willen et al. |
| 7,222,218 B2 | 5/2007 | Dutt et al. |
| 7,318,090 B1 | 1/2008 | Fairman et al. |
| 7,321,942 B2 | 1/2008 | Flautner et al. |
| 7,424,712 B1 | 9/2008 | Sistare et al. |
| 7,707,578 B1 | 4/2010 | Zedlewski et al. |
| 7,730,486 B2 | 6/2010 | Herington |
| 7,743,384 B2 | 6/2010 | Cabillic et al. |
| 7,752,610 B2 | 7/2010 | Cabillic et al. |
| 7,784,057 B2 | 8/2010 | Davis et al. |

(Continued)

OTHER PUBLICATIONS

Arpaci-Dusseau "Implicit Coscheduling: Coordinated Scheduling with Implicit Information in Distributed Systems", 1998, 224 pages.*

(Continued)

*Primary Examiner* — Van Nguyen

(57) ABSTRACT

Techniques for implicit coscheduling of CPUs to improve corun performance of scheduled contexts are described. One technique minimizes skew by implementing corun migrations, and another technique minimizes skew by implementing a corun bonus mechanism. Skew between schedulable contexts may be calculated based on guest progress, where guest progress represents time spent executing guest operating system and guest application code. A non-linear skew catch-up algorithm is described that adjusts the progress of a context when the progress falls far behind its sibling contexts.

14 Claims, 7 Drawing Sheets

(56) References Cited

U.S. PATENT DOCUMENTS

| | | | |
|---|---|---|---|
| 7,810,094 B1 | 10/2010 | McClure et al. | |
| 7,895,594 B2 | 2/2011 | Kirilline et al. | |
| 7,954,102 B2 | 5/2011 | Okawara | |
| 8,099,732 B2 | 1/2012 | Tran et al. | |
| 8,127,301 B1 | 2/2012 | Waldspurger et al. | |
| 8,171,488 B1 | 5/2012 | Waldspurger et al. | |
| 8,176,493 B1 | 5/2012 | Waldspurger et al. | |
| 8,296,767 B1 | 10/2012 | Waldspurger et al. | |
| 8,752,058 B1 * | 6/2014 | Zheng | G06F 9/45533 718/1 |
| 9,244,732 B2 * | 1/2016 | West | G06F 9/4881 |
| 2004/0054999 A1 | 3/2004 | Willen et al. | |
| 2005/0097228 A1 | 5/2005 | Flautner et al. | |
| 2005/0132364 A1 | 6/2005 | Tewari et al. | |
| 2006/0143616 A1 | 6/2006 | Koike et al. | |
| 2007/0050779 A1 | 3/2007 | Hayashi | |
| 2007/0204268 A1 | 8/2007 | Drepper | |
| 2008/0022280 A1 | 1/2008 | Cherkasova et al. | |
| 2008/0059712 A1 | 3/2008 | Fedorova | |
| 2008/0092142 A1 | 4/2008 | Tran et al. | |
| 2010/0037234 A1 | 2/2010 | Udupa et al. | |
| 2010/0205602 A1 | 8/2010 | Zedlewski et al. | |
| 2011/0055479 A1 * | 3/2011 | West | G06F 9/4881 711/118 |

OTHER PUBLICATIONS

Choi et al. "Coscheduling in Clusters: Is It a Viable Alternative?", 2004 IEEE, 13 pages.*

VMware, "VMware ESC Server 2: Architecture and Performance Implications", Aug. 3, 2005, 23 pages, http://www.vmware.com/pdf/esx2_performance_implications.pdf.

VMware, "VMware Delivers VMware vSphere 4, A Quantum Leap Forward", "VMware News Releases", May 20, 2009, 4 pages, http://www.vmware.com/company/news/releases/vsphere-ga.html.

* cited by examiner

IMPLICIT CO-SCHEDULING OF CPUS

CROSS REFERENCE TO RELATED APPLICATIONS

The present application is a divisional of and claims the benefit of U.S. patent application Ser. No. 13/105,396, filed on May 11, 2011, which claims the benefit of U.S. Provisional Patent Application No. 61/333,486, filed on May 11, 2010, both of which are hereby incorporated by reference herein.

BACKGROUND

Symmetric multiprocessing (SMP) is a well-known computer architecture whereby a single operating system instance controls multiple processors (CPUs) that are each connected to shared main memory. Each CPU is an execution engine with its own instruction pipeline, and can be one core of a multi-core processor. For example, a quad-core processor can be said to have four CPUs, and a computer system having four quad-core processors, therefore, has sixteen CPUs. The operating system can assign multiple threads to a corresponding multiplicity of CPUs, which execute the threads simultaneously in tandem.

In virtualization technology, a virtual machine (VM) is created as a software abstraction of a physical computer system, in which virtual resources of the VM are mapped by virtualization software, commonly referred to as a hypervisor, to underlying physical resources. The SMP architecture can be virtualized in this manner such that a particular VM has a plurality of virtual CPUs (VCPUs) each executing threads assigned to the VCPUs by a guest operating system that runs inside the VM. The hypervisor then assigns the corresponding VCPUs (or other abstraction of tasks) to underlying physical CPUs. There need not be a one-to-one relationship between VCPUs running in a VM and physical CPUs on the host (i.e., the hardware platform supporting the VM). In fact, a host having a single CPU can support VMs having a plurality of VCPUs, and vice versa.

In conventional systems, operating systems generally assume that the processors that the operating system manages run at approximately the same rate. For non-virtualized systems, the processors managed by the operating system are physical, are under the direct control of the operating system, and generally run off the same clock. However, in a virtualized environment, the processors managed by a guest operating system are abstractions that are scheduled by the underlying hypervisor that time-slices physical CPUs (PCPUs) so that the PCPUs can be shared across a number of VMs and host processes. At any particular point in time, a particular VCPU may be scheduled, descheduled, preempted, or blocked (i.e., waiting for some event). Therefore, inappropriate scheduling of VCPUs belonging to a VM can cause one VCPU to run faster than another VCPU, violating the assumption of the guest operating system, and potentially leading to errors or panic by the guest operating system.

The term "skew" is used herein to refer to the difference in execution time of one VCPU relative to another VCPU associated with an SMP VM. Skew can be expressed as a time measurement, which indicates an amount of progress one VCPU has made in comparison to another VCPU. The hypervisor uses well-known techniques, such as physical performance counters in the CPUs, to measure execution time and therefore skew. In prior systems, progress is determined by periodically sampling the state of each VCPU to determine whether the VCPU is running, and if so, incrementing a value. Skew is then calculated as the difference between values corresponding to different VCPUs.

Co-scheduling is implemented to reduce skew. Strict co-scheduling involves forcibly stopping sibling VCPUs when a particular VCPU falls too far behind, and restarting all of the VCPUs simultaneously after skew is detected. In relaxed co-scheduling, only a subset of the VCPUs of a VM are co-scheduled simultaneously after skew is detected. More specifically, in relaxed co-scheduling, only VCPUs that are skewed (i.e., lagging) beyond a particular threshold are co-started. This ensures that when any VCPU is scheduled, all other VCPUs that are lagging will also be scheduled, thereby reducing skew. More details of relaxed coscheduling are described in U.S. patent application Ser. No. 11/707,729, entitled, "Defining And Measuring Skew Between Coscheduled Contexts," filed Feb. 16, 2007, and incorporated herein by reference in its entirety.

Strict and relaxed co-scheduling work well with VMs having two to four VCPUs. However, as the number of VCPUs running in a single VM increases, the performance impact of simultaneously stopping and restarting sibling VCPUs becomes increasingly noticeable, even with hosts having a large number of physical CPUs.

SUMMARY

Implicit coscheduling of CPUs is implemented using proactive corunning techniques, including migrating of contexts to improve corun performance of scheduled contexts and reactive skew limit techniques. In one embodiment, a corun migration algorithm a context that is waking up may be migrated to another processor if the current processor is already executing or has queued a sibling context. In another embodiment, a context may be pulled from another processor when one processor becomes idle in a way to improve an overall corunning ratio. Skew between schedulable contexts may be calculated based on guest progress, where guest progress represents the time executing guest code for a virtual machine. A non-linear skew catch-up algorithm is described that allows a progress of a virtual processor to advance faster when the progress falls far behind its sibling contexts.

DETAILED DESCRIPTION

Figure 1:
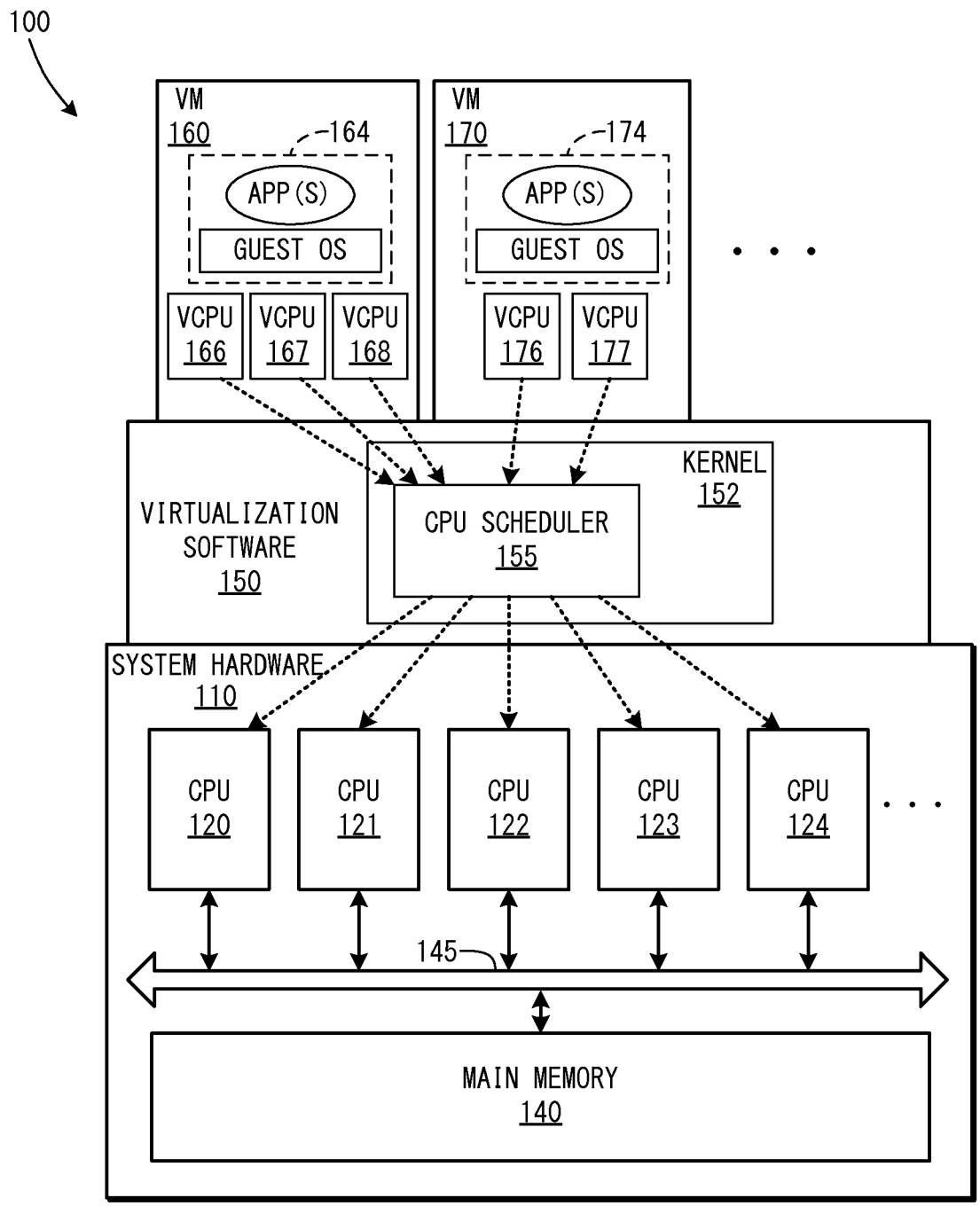
FIG. 1 illustrates a computer system in which one or more embodiments of the invention may be practiced.

FIG. 1 illustrates a computer system 100 in which one or more embodiments of the invention may be practiced. Computer system 100 includes a system hardware 110 having one or more central processing units (CPUs) 120-

124. Main memory 140 may comprise a system of memories, including volatile and nonvolatile memory, and can include uniform or non-uniform memory accesses (NUMA). A "memory interconnect" 145 refers to communication paths for accessing memory 140.

System hardware 110 can include components aside from those specifically shown in FIG. 1, and such omissions are for the purpose of not obscuring the most relevant elements of system 100 and should therefore not be construed as being limiting in any way. For example, system hardware 110 may include input/output (I/O) devices and interfaces, memory management unit(s), graphics and/or audio processor(s), and so forth. Although FIG. 1 shows five CPUs 120-124, any number of CPUs may be supported, as suggested by ellipsis to the right of CPU 124. In addition, CPUs 120-124, main memory 140, and memory interconnect 145, may comprise one node in a system with additional nodes (not shown) forming a NUMA-based architecture. In such systems, a plurality of nodes each having one or more processors, local memory, and local input/output channels, are connected together so that they can read each other's memory and update each other's cache to ensure cache-coherency. NUMA architecture is referred to as "non-uniform" because it takes less time for an intra-node memory access (i.e., a processor accessing local memory) than it takes for an inter-node memory access (i.e., a processor accessing a remote memory).

In the example presented by system 100, virtualization software 150 is executing on system hardware 110. Virtualization software 150 resides in main memory 140 and is executed by one more CPUs 120-124. However, as shown conceptually in FIG. 1, the virtualization software 150 can be thought of as running "on top of" system hardware 110. Virtualization software 150 may comprise a plurality of software layers including a kernel 152, which manages the hardware resources of system hardware 110, and an instance of a virtual machine monitor (VMM) (not shown) for each virtual machine (VM). The virtualization software 150 emulates hardware resources for the VMs. Kernel 152 includes CPU scheduler 155 for prioritizing and dispatching execution threads to CPUs 120-124.

Each VM 160, 170 is an abstraction of a physical computer system, having virtual hardware including one or more virtual central processor units (VCPUs) 166-168, 176-177. In addition, each VM 160, 170 includes guest system software 164, 174, respectively, which includes a guest operating system (OS) and any number of applications ("APP(S)"). The guest OS may be a commodity operating system, such as Windows® or Linux®, or a specialized "para-virtualized" operating system. In either case, the guest OS includes a kernel (not shown) that, among other tasks, assigns processes, such as those associated with the guest applications, to the VCPUs that are conceptually part of that VM but are implemented by virtualization software 150.

Instructions executing on VCPUs 166-168, 176-177 may be directly executed on CPUs 120-124 under the direction and control of virtualization software 150. In one embodiment, the VMMs (not shown) include a thread mapped to each VCPU in the corresponding VM, which is assigned by CPU scheduler 155 to one of the CPUs 120-124. In addition to the VMM threads, the CPU scheduler 155 assigns threads corresponding to kernel 152, so that kernel 152 can carry out its own tasks. CPU scheduler 155 distributes hardware resources, including CPU time, to each thread corresponding to each virtual core, and to any threads running within virtualization software 150.

System hardware 110 can support any number of VMs, although only two are shown in FIG. 1. For example, hundreds of VMs can be supported on a single hardware platform with modern server hardware. The number of VMs that can run on a single hardware platform is limited by the system resource utilization within each VM (i.e., the load generated by guest system software) and the physical resources available on the host hardware platform. In addition, each VM can have any number of VCPUs, e.g., eight or more VCPUs.

Figure 2:
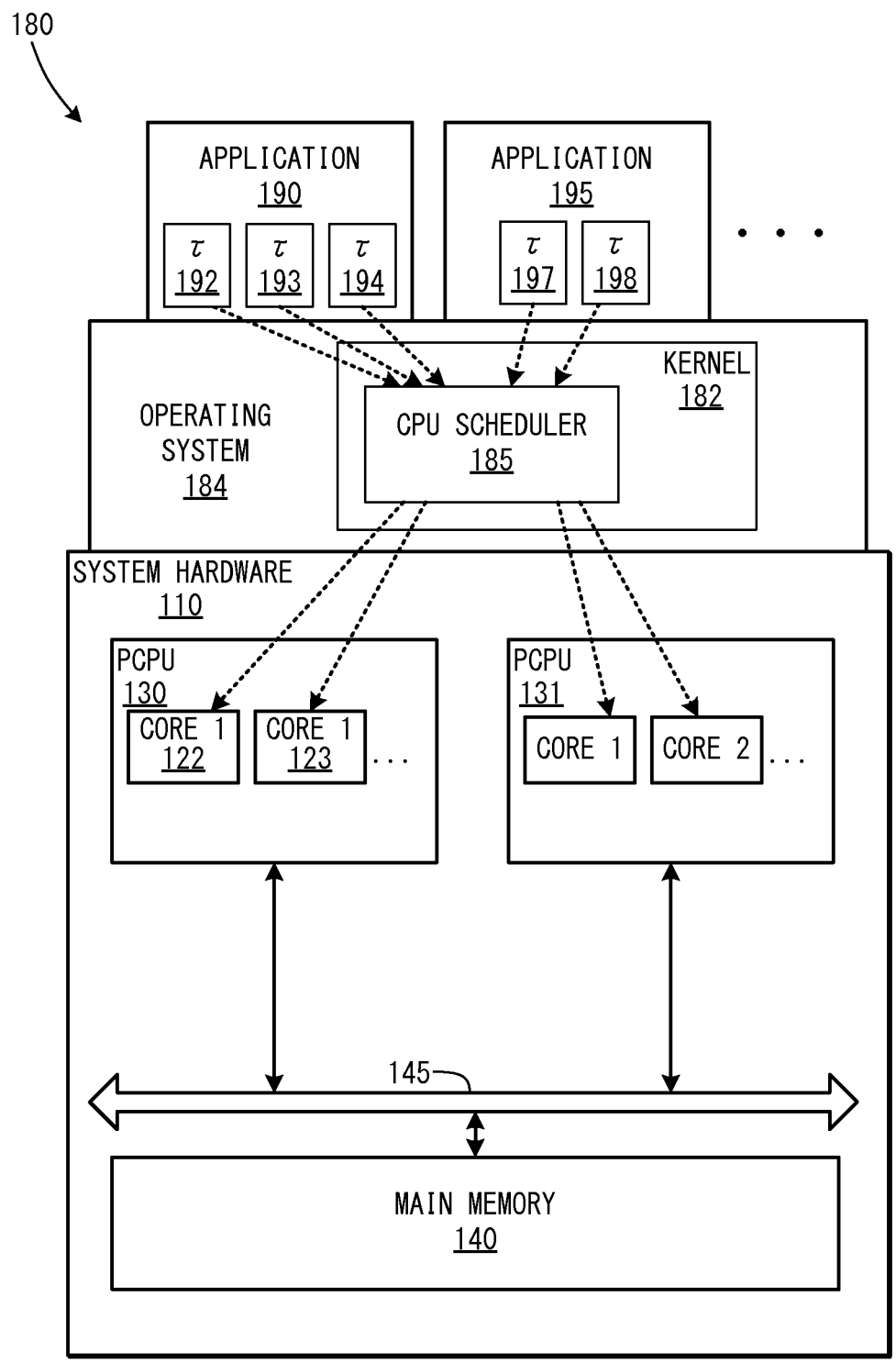
FIG. 2 illustrates a system having system hardware with an operating system executing thereon.

FIG. 2 illustrates a system 180 having system hardware 110 with an operating system 184 executing thereon. As shown, the system 180 includes system hardware 110, as described above with reference to FIG. 1, but with a traditional operating system 184 executing thereon, as shown conceptually in FIG. 2 by positioning operating system 184 on system hardware 110. Operating system 184 includes a kernel 182 for managing physical system hardware 110, and other components and modules (not shown) providing an execution environment for executing applications 190, 195. Each application 190, 195 can have one or more threads 192-194, 197-198, respectively, that are assigned by CPU scheduler 185 to one or more physical CPUs (PCPUs) 130-131 of system hardware 110.

CPU scheduler 155 shown in FIG. 1 and the CPU scheduler 185 shown in FIG. 2 may manage PCPU cycles according to a generalized processor sharing (GPS) model. With GPS, each thread appears to execute on its own dedicated processor at a rate proportional to a value given by a weight assigned to the thread divided by the sum of all the weights of all the threads. Thus, the greater the assigned weight for the thread relative to weights of other threads, the faster the thread executes relative to the other threads in the system. The GPS model is considered a "proportional fair" system since the hardware resource is fairly distributed proportionally to the assigned weights. The CPU scheduler then determines which thread should be scheduled next based on which thread has not had its fair share of the processor resources based on the assigned weight of the thread.

Threads may execute until blocked or preemptively descheduled (i.e., "stopped") by CPU scheduler 155, 185. For example, a thread may be blocked when an input/output or event request is issued and execution cannot continue until the needed data is retrieved or some other event needs to complete. In virtualized computer systems such as those described above with reference to FIG. 1, the CPU scheduler 155 may deschedule a thread corresponding to a virtual core if the CPU scheduler 155 detects that the guest OS managing the virtual core is in an idle loop. By way of example, U.S. patent application Ser. No. 10/871,922, filed Jun. 18, 2004, incorporated herein by reference, presents an example of idle loop detection in guest operating systems.

In some embodiments, the weight assigned to each thread can be an arbitrary number. In one embodiment, the number is taken or derived from values given to processes, applications, virtual machines, or other software execution entities or abstractions, by an administrator or user of the computer system. For example, an administrator may decide that VM 160 (FIG. 1) is more important than VM 170, and should therefore be given three times the resources of VM 170. For example, the administrator/user may assign a weight value of 120 to VM 160 and a weight value of 40 to VM 170, or any pair of numbers having a 3:1 ratio. In one embodiment, the weight of 120 assigned to VM 160 is divided evenly among each virtual cores 166-168, so that each of the three virtual cores in VM 160 inherits one-third of the assigned weight of 120, i.e., a weight of 40. The virtualization software then takes the three threads created by the VMM (not shown) for VM 160, i.e., one thread for each virtual core, and assigns PCPU time according to the weight of 40. VM 170, having two virtual CPUs, is assigned weight of 40. Each core inherits half of the weight, i.e., a weight of 20 is assigned to each of VCPUs 176-177. The CPU scheduler 155 assigns threads for virtual cores 166, 167, 168, 176, and 177 to available PCPU cores according to the ratio 40:40:40:20:20, respectively.

In another embodiment, a weight or resource share is assigned to each VM without dividing the resource between the VCPUs of the VM. In this embodiment, the consumption of PCPU execution time consumed by each VM is tracked as a total of its constituent VCPU resource consumption. Therefore, if one of the VCPUs idles in the VM, the share of PCPU resources allocated to that VM flows to the running VCPUs.

In some embodiments, the GPS model can only be approximated since there are can be fewer physical processing cores than threads, and each core is time shared at some discrete granularity of time (e.g., several milliseconds).

As described above, embodiments are related to the tracking and management of co-scheduled "contexts" that execute on a computer system. A context may represent different software constructs, depending on the underlying system. For example, a context may be a process associated with an application or a thread that is associated with a process. In some embodiments, a context may be a virtual machine or a "virtual processor" (VCPU) associated with a virtual machine. In other embodiments, "contexts" may be a set of processes associated with a parallel application or a collection of threads associated with a process. The context sets may be permanent (e.g., as in the case of virtual processors that are part of a virtual machine) or transient (e.g., as in the case of virtual machines or applications that collaborate on a transaction only until the transaction is completed). While the examples presented herein refer specifically to VCPUs as managed contexts, it should be understood that the invention may be implemented for any software construct.

Conventional techniques, such as strict co-scheduling and relaxed co-scheduling described above, are inherently non-scalable when there is a large number of contexts (e.g., VCPUs) in a VM since these techniques try to stop and start the contexts simultaneously. In contrast, a "proactive" approach to co-scheduling is described herein that attempts to ensure that a detrimental amount of skew does not occur in the first place and does not require simultaneous co-start and co-stop.

In one embodiment of a proactive approach, the VM kernel (e.g., kernel 152 in FIG. 1) attempts to run VCPUs of the same VM in parallel whenever possible. The VCPUs for a particular VM are referred to as "sibling" VCPUs. Running sibling VCPUs in parallel can generally avoid or mitigate the performance and correctness problems associated with skew described above since doing so conforms with the assumption made by the guest OS that each VCPU is running at the same rate.

The "corunning ratio" is a metric that is used to measure the degree of parallelism of the VCPUs of a VM are executing. In one embodiment, the corunning ratio is based on the number of running VCPUs relative to the total number of VCPUs in the VM. Two exemplary techniques are described below for improving the corunning ratio: a corun migration mechanism, described in FIGS. 3-4, and a corun bonus mechanism, described in FIGS. 5-6.

Corun Migrations

Figure 3:
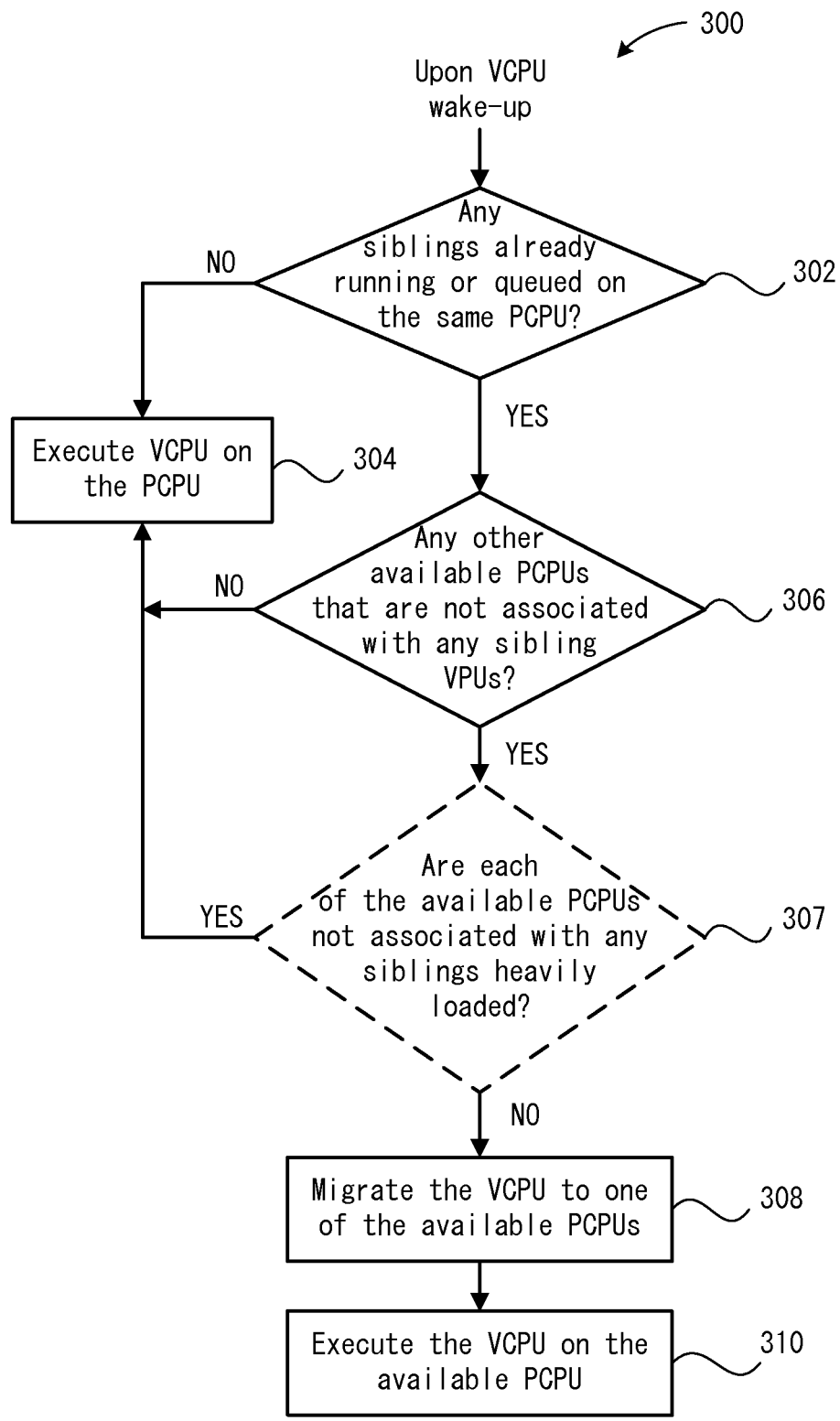
FIG. 3 is a flow diagram of an exemplary method for performing corun migrations upon VCPU wake-up.
Figure 4:
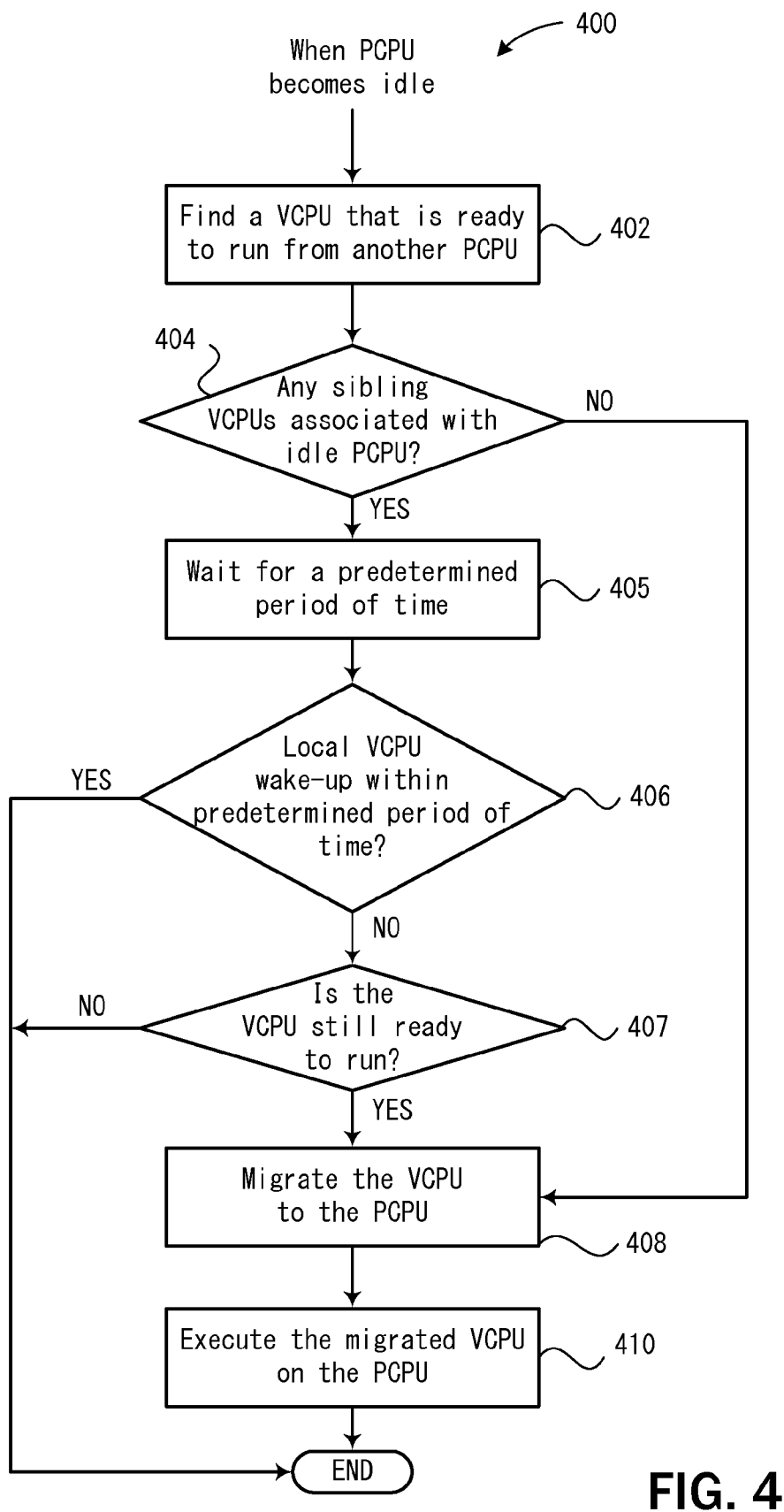
FIG. 4 is a flow diagram of an exemplary method for performing corun migrations when a PCPU become idle.

To run sibling VCPUs in parallel, sibling VCPUs are placed on different PCPUs, if possible. An exemplary algorithm presented herein attempts to place sibling VCPUs on different PCPUs using two approaches. FIG. 3 shows an algorithm that attempts to migrate a VCPU off of a physical CPU (PCPU) if the PCPU is already executing a sibling VCPU. FIG. 4 shows an algorithm that pulls a VCPU from another busy PCPU when a particular PCPU becomes idle.

In FIG. 3, a flow diagram shows an exemplary method for performing corun migrations upon VCPU wake-up. Even though the method 300 is described in conjunction with the systems of FIGS. 1-2, any system may be configured to perform the method steps, in any suitable order.

As shown, the method 300 begins at step 302, where a CPU scheduler, such as the CPU scheduler 155 or 185, determines whether there are any sibling VCPUs already running or queued on the same PCPU associated with the VCPU. If not, then the method 300 proceeds to step 304, where the CPU scheduler executes the VCPU on the PCPU.

If, at step 302, the CPU scheduler determines that there are siblings VCPUs already running or queued on the same PCPU, then the method 300 proceeds to step 306. At step 306, the CPU scheduler determines whether there are any other available PCPUs that are not associated with any sibling VCPUs. If the CPU scheduler determines that there are no other available PCPUs that are not associated with any sibling VCPUs, then the method 300 proceeds to step 304, where the CPU scheduler executes the VCPU on the PCPU.

If the CPU scheduler determines that there is at least one other available PCPU that is not associated with any sibling VPUs, then the method 300 proceeds to step 307. At step 307, the CPU scheduler determines whether each of the available PCPUs that is not associated with any siblings is heavily loaded. In one embodiment, a PCPU is heavily loaded when its resource utilization is above a predetermined threshold. If the CPU scheduler determines that each of the available PCPUs that is not associated with any siblings is heavily loaded, then the method 300 proceeds to step 304, described above. If the CPU scheduler determines that at least one of the available PCPUs that is not associated with any siblings is not heavily loaded, then the method 300 proceeds to step 308. In some embodiments, step 307 is optional and is omitted, as indicated by the dashed lines around step 307. In these embodiments, the method 300 proceeds from step 306 to step 308 when there is at least one other available PCPUs that is not associated with any sibling VPUs.

At step 308, the CPU scheduler migrates the VCPU to one of the available PCPUs. At step 310, the CPU scheduler executes the VCPU on the available PCPU. In this manner, the VCPUs are migrated to other PCPUs that are not already executing other sibling VCPUs, if possible.

FIG. 4 is a flow diagram of an exemplary method for performing corun migrations when a PCPU become idle. Even though the method 400 is described in conjunction with the systems of FIGS. 1-2, any system may be configured to perform the method steps, in any suitable order.

As shown, the method 400 begins at step 402, in which, upon a PCPU becoming idle, the CPU scheduler finds a VCPU that is ready to run that is currently associated with another PCPU.

At step 404, the CPU scheduler determines whether any sibling VCPUs are associated with the idle PCPU. If the CPU scheduler determines that that no sibling VCPUs are associated with the idle PCPU, then the method 400 proceeds to step 408, described below.

If, at step 404, the CPU scheduler determines that that least one sibling VCPU is associated with the idle PCPU, then the method 400 proceeds to step 405. At step 405, the CPU scheduler waits for a predetermined period of time. In one example, the predetermined period of time may be 2 ms.

At step 406, the CPU scheduler determines whether a local VCPU associated with the first PCPU has woken-up within the predetermined period of time. If the CPU scheduler determines that a local VCPU associated with the first PCPU has woken-up within the predetermined period of time, then the method 400 terminates. As described above, if the first PCPU is only idle for a short period of time, then the migration cost of migrating VCPUs may outweigh the improved utilization, since those VCPUs may need to be migrated away from the PCPU when the other VCPU wakes up.

If, at step 406, the CPU scheduler determines that no local VCPU associated with the first PCPU has woken-up within the predetermined period of time, then the method 400 proceeds to step 407. At step 407, the CPU scheduler determines whether the VCPU associated with the other PCPU is still ready to run. If the CPU scheduler determines that the VCPU associated with the other PCPU is no longer ready to run, the method 400 terminates. If the CPU scheduler determines that the VCPU associated with the other PCPU is still ready to run, the method 400 proceeds to step 408.

At step 408, the CPU scheduler migrates the VCPU associated with the other PCPU to the idling PCPU. At step 410, the CPU scheduler executes the migrated VCPU on the PCPU.

Corun Bonus

In one embodiment of the invention, the overall corunning ratio is improved by implementing a corun bonus mechanism. Common to many proportional fair scheduling algorithms, such as GPS, described above, or "weighted fair queuing" (WFQ), is the notion of virtual time. In some embodiments, the virtual time of a thread increases in proportion to real-time based on the weight assigned the particular thread such that:

$$v'(t) = v(t) + \frac{q}{w} \quad \text{(Equation 1)}$$

where v'(t) is the updated virtual time for a particular thread at real-time t, v(t) is the current virtual time for that thread before being updated, q is the actual time spent by that thread using a resource, and w is the weight for that thread. The actual time q spent by the thread may be determined by PCPU execution time since the last update to v(t) for the thread. By prioritizing clients with lower virtual times, e.g., by scheduling them first, proportional-fair schedulers favor clients who received less CPU time than their proportional share. More precisely, the CPU usage ratios of threads match (or approximate) the relative weights of the threads when the system is overcommitted, i.e., the threads are fully backlogged.

Figure 5:
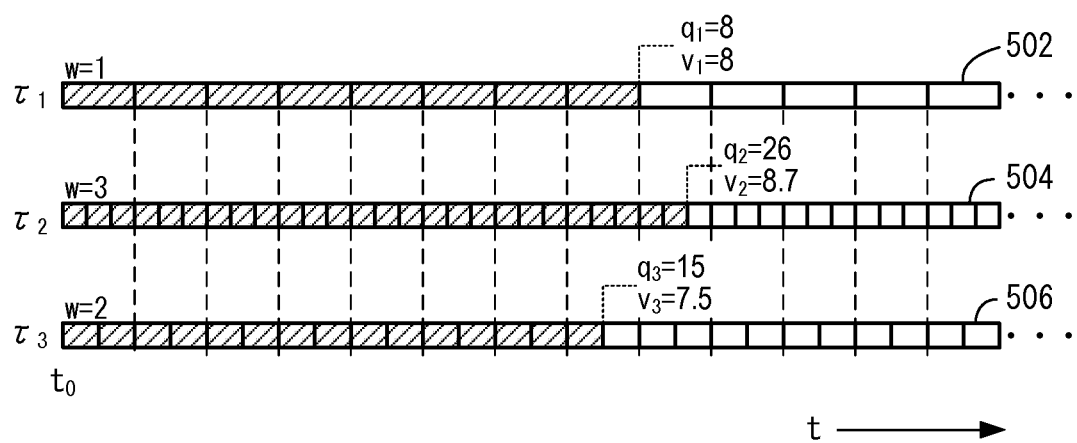
FIG. 5 is a conceptual diagram that illustrates virtual time.

FIG. 5 is a conceptual diagram that illustrates virtual time using timelines. As shown, timelines 502, 504, 506 correspond to threads $\tau_1$, $\tau_2$, and $\tau_3$, respectively. Although only three threads are shown, many other threads can be executing concurrently with the three threads shown. Each timeline illustrates virtual time for each of the corresponding threads and is broken up into segments, where each segment represents one millisecond of real time. Because virtual time varies from one thread to another according to their assigned weights, a millisecond of real time translates to less virtual time for threads assigned greater weights than for threads assigned smaller weights.

For example, FIG. 5 shows thread $\tau_1$ having a weight w=1, thread $\tau_2$ having a weight w=3, and thread $\tau_3$ having a weight w=2. At an initial time $t_0$, none of the threads have run for any amount of time. Accordingly, the virtual time for each thread equals zero. In one example, suppose thread $\tau_1$ executes for 8 milliseconds (ms) from time $t_0$ and is then blocked or is preemptively descheduled 8 milliseconds later so that $q_1$=8 ms. Applying Equation 1 to thread $\tau_1$ gives: $v_1'$=0+(8/1)=8.

The CPU scheduler then schedules thread $\tau_2$, which runs for 26 ms of real-time before being blocked or otherwise descheduled, so that $q_2$=26 ms. Applying Equation 1 to thread $\tau_2$ gives: $v_2'$=0+(26/3)=8.7.

When thread $\tau_3$ executes, it runs for 15 ms of real-time before being blocked or otherwise descheduled, so that $q_3$=15 ms. Applying Equation 1 to thread $\tau_3$ gives: $v_3'$=0+(15/2)=7.5.

As can be seen from the example above, virtual time accumulates more slowly for threads with higher weights. For example, although thread $\tau_3$ has executed nearly twice as long as thread $\tau_1$, thread $\tau_3$ has a smaller virtual time and would therefore be next in line to execute (assuming that thread $\tau_3$ becomes unblocked before its turn comes again).

Again, the CPU scheduler may be invoked on many PCPUs concurrently. When the CPU scheduler is invoked on a certain PCPU, in some embodiments, the CPU scheduler attempts to run the VCPU with more siblings running (on other PCPUs) to improve the overall corunning ratio. To do that, the CPU scheduler gives the VCPUs with running siblings a "priority boost" when making scheduling decisions.

As described above, the priority of a VCPU can be decided by its virtual time. In some embodiments, a "priority boost" is given to a VCPU by reducing a VCPU's virtual time by a "corun bonus." The corun bonus may be based on the number of sibling VCPUs that are running on other PCPUs. In this manner, a VCPU that has more sibling VCPUs running on other PCPUs is given higher priority, and is therefore less likely to fall behind the other sibling VCPUs. The default corun bonus, in one embodiment, is one scheduling quantum normalized by a CPU entitlement associated with a VCPU. Optionally, embodiments can further scale the corun bonus based on the number of corunning sibling VCPUs. This approach does not require explicit synchronization among PCPUs.

Figure 6:
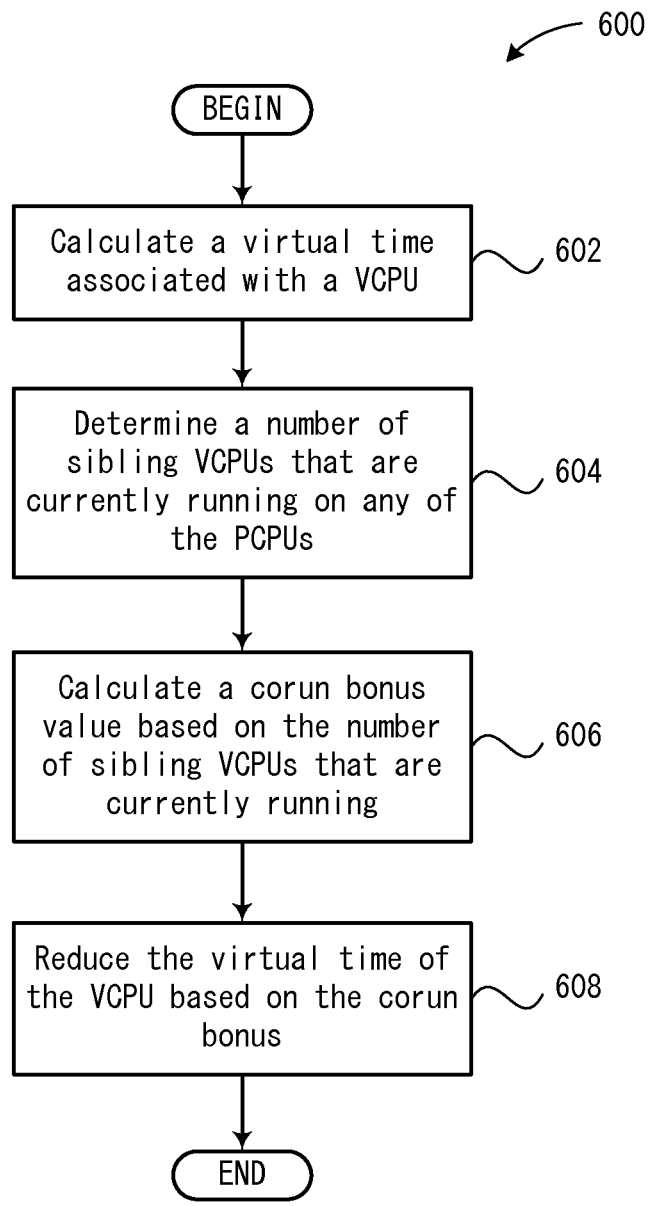
FIG. 6 is a flow diagram of an exemplary method for reducing a virtual time associated with a VCPU based on a corun bonus.

FIG. 6 is a flow diagram of an exemplary method for reducing a virtual time associated with a VCPU based on a corun bonus. Even though the method 600 is described in conjunction with the systems of FIGS. 1-2 and 5, any system may be configured to perform the method steps, in any suitable order.

As shown, the method 600 begins at step 602, where a CPU scheduler calculates a virtual time associated with a VCPU. In one embodiment, the virtual time can be computed using Equation 1, described above. At step 604, the CPU scheduler determines a number of sibling VCPUs that are currently running on any of the PCPUs.

At step 606, the CPU scheduler calculates a corun bonus value based on the number of sibling VCPUs that are currently running on other PCPUs. In one embodiment, the default corun bonus is one scheduling quantum normalized by a CPU entitlement associated with a VCPU. Optionally, embodiments can further scale the corun bonus based on the number of corunning sibling VCPUs. At step 608, the CPU scheduler decreases the virtual time of the VCPU based on the corun bonus. In this manner, a VCPU that has more sibling VCPUs running is given higher priority by the CPU scheduler, and thus is less likely to fall behind its sibling VCPUs.

As described above, embodiments attempt to proactively reduce the risk of a skew between sibling VCPUs exceeding a certain threshold by implementing corun migration and corun bonus techniques. However, even when implementing these techniques, the skew between two VCPUs may still exceed the acceptable threshold. For example, while statistically VCPUs of the same VM will be run in parallel most of the time, it might happen that a certain VCPU consumes more CPU time than its siblings during some time interval. Previous approaches have dealt with this situation using strict co-scheduling or relaxed co-scheduling, as described above.

Reactive Skew Limit Techniques

Skew between two VCPUs may be defined by their VCPU progress: skew($VCPU_i$,$VCPU_j$)=vcpu_progress($VCPU_i$)–vcpu_progress($VCPU_j$).

The "vcpu_progress" of a VCPU can be based on the VCPU's "guest_progress." A VCPU's guest_progress is defined as time during which the VCPU is running the guest OS or guest application. One example of instructions that the VCPU could be running that are not included in guest_progress is VM emulation overhead, which is typically run in kernel mode. The guest_progress represents the cumulative progress made by the guest code since the VCPU has started. In certain embodiments, guest_progress advances when a VCPU is either running in guest mode or being idle.

Further, it should be noted that when calculating the progress of a VCPU, a VCPU that is "idle" or in a formal "halt" state (e.g., as a result of the HLT instruction for the x86 processor architecture) may be considered to be scheduled or running even if it is not. For example, an idle VCPU may execute a guest instruction to halt the VCPU until the next virtual interrupt. Because the guest OS cannot observe the difference between a halted VCPU that is still scheduled and a halted VCPU that has been descheduled transparently by the virtualization platform (e.g., kernel 152 or VMM), an idle or halted VCPU can be treated as if it were scheduled or running for purposes of measuring skew. Thus, in some embodiments, a VCPU is considered scheduled even if it is idle or in a halt state.

A. Enforcing Skew Limit

To ensure that no VCPU gets too far ahead of sibling VCPUs, the "slowest VCPU" for each VM may be tracked. The slowest VCPU is the VCPU with the smallest vcpu_progress among the VCPUs that are not currently making progress. Whenever a VCPU leaves kernel mode, its VCPU progress is compared with the slowest VCPU. If the skew is more than a specified threshold (for example, 3 milliseconds), the VCPU is descheduled, i.e., stopped. In addition, the progress of the running VCPU may be periodically sampled to make sure the skew of the VCPU is limited even if the VCPU does not make many VM kernel calls. In one embodiment, the sampling rate is every 2 milliseconds.

In one embodiment, the CPU scheduler disables the skew limit enforcement for the whole VM when any VCPU in the VM is waiting for a VMM (virtual machine monitor) lock or a VMM semaphore. This is because the CPU scheduler generally does not know which VCPU is holding the lock or semaphore. If the CPU scheduler keeps the skew limit enforcement, the VCPU holding the semaphore/lock might be descheduled to wait for the slowest VCPU to start running However, the slowest VCPU cannot run because it is waiting on the semaphore/lock to be released. The CPU scheduler disables the skew limit enforcement in these occasions to avoid such deadlocks.

When the skew limit enforcement is disabled, a VCPU may consume far more CPU time than its siblings. If the CPU scheduler enforces the skew limit based on guest_progress, then this VCPU can be descheduled for a long time. Stopping a VCPU for too long is generally bad for performance. This might also confuse a VMM time tracker, which is configured to monitor one or more metrics associated with VCPU execution, because the VMM requires a VCPU to be scheduled frequently enough to achieve smooth guest timer interrupt delivery. Stopping a VCPU for too long is unnecessary since the CPU scheduler co-stops a VCPU mainly to avoid the VCPU from wasting too much time on busy-waiting for the response from other VCPUs. The past skew no longer matters once the requested VCPU is scheduled to run to release the requested resource.

B. Non-linear Skew Catchup

To avoid a VCPU being descheduled for too long, in certain embodiments, the VCPU progress is updated, i.e., adjusted, in a manner that allows a VCPU falling far behind to catch up more quickly. In some embodiments, the vcpu_progress is updated in three occasions: when the VCPU is descheduled, when the VCPU wakes up from idle, and when the periodic sampling happens. When such occasions happen, embodiments first check the delta of the guest progress since the last update. The "skew" between this VCPU and the VCPU with the largest vcpu_progress may also be computed. If (skew<T), embodiments advance the VCPU progress by δ(guest_progress), where T is a predefined threshold. The default value of T can be, for example, 2 ms. To allow a VCPU to catch up more quickly, embodiments advance the vcpu_progress of the VCPU by $2^n$*δ (guest_progress), where n is the value that satisfies the inequality:

$$2^{(n-1)}*T<\text{skew}<2^n*T \quad \text{(Equation 2)}$$

For example, if the skew is 10 ms and T=2 ms, then n is equal to 3, i.e., $$2^{3-1}*2=8<\text{skew}=10<2^3*2=16. \quad \text{(Equation 3)}$$

Thus, the vcpu_progress in this example is updated as $2^3$*δ (guest_progress).

Figure 7:
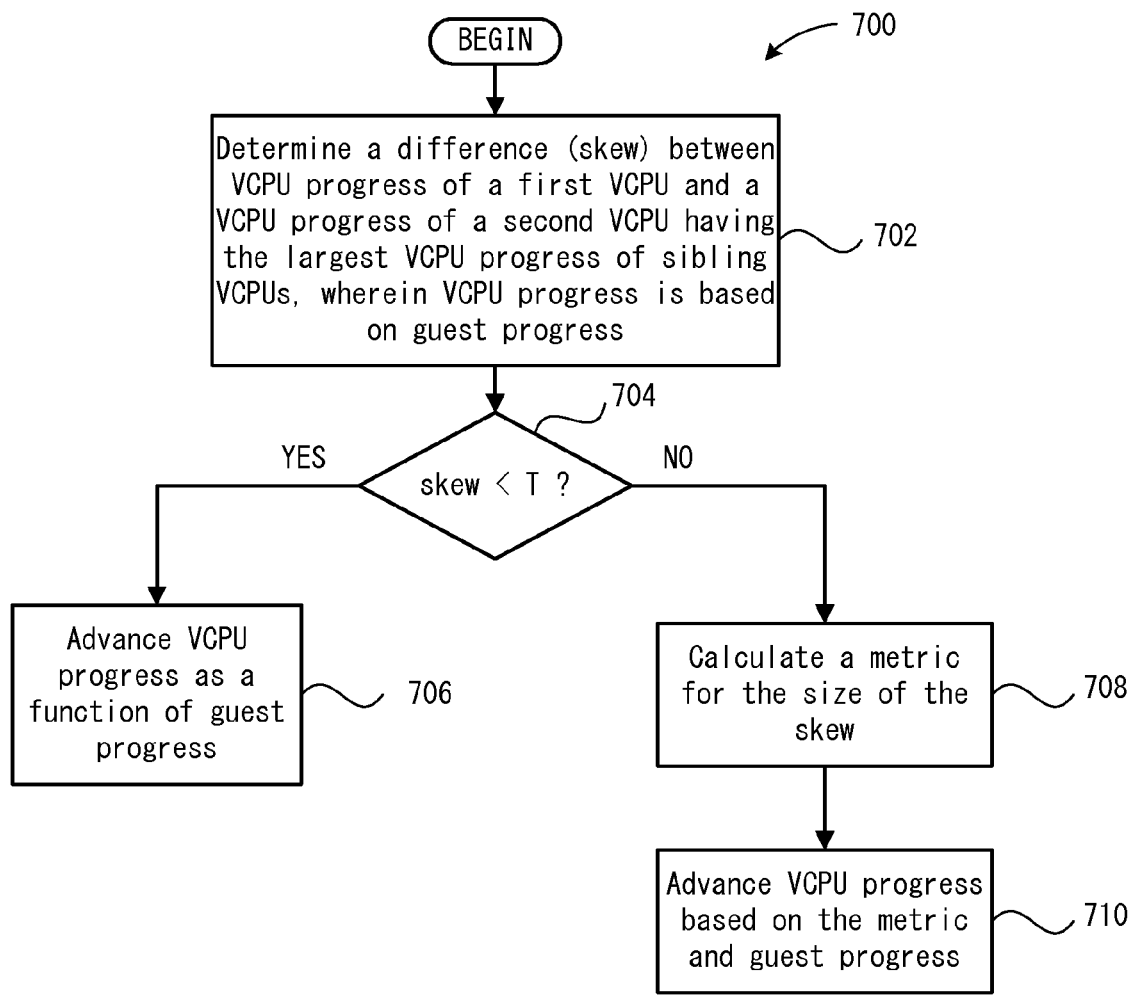
FIG. 7 is a flow diagram of an exemplary method for non-linear skew catch-up.

FIG. 7 is a flow diagram of an exemplary method for non-linear skew catch-up. Even though the method 700 is described in conjunction with the systems of FIGS. 1-2 and 5, any system may be configured to perform the method steps, in any suitable order.

As shown, the method 700 begins at step 702, where a CPU scheduler determines a difference (i.e., skew) between vcpu_progress of a first VCPU and a vcpu_progress of a second VCPU having the largest vcpu_progress of sibling VCPUs, where vcpu_progress is based on guest_progress. As described above, the guest_progress represents the cumulative progress made by the guest code since the VCPU has started.

At step 704, the CPU scheduler determines whether the skew is less than a predefined threshold value T. If the CPU scheduler determines that the skew is less than the predefined threshold value T, then the method 700 proceeds to step 706, where the CPU scheduler advances vcpu_progress as a function of guest_progress.

If, at step 704, the CPU scheduler determines that the skew is not less than the predefined threshold value T, then the method 700 proceeds to step 708. At step 708 the CPU scheduler calculates a metric for the size of the skew. In one embodiment, the metric may be a value of n that satisfies the inequality: $2^{(n-1)}*T<skew<2^n*T$.

At step 710, the CPU scheduler advances VCPU progress based on the metric and guest progress. In one embodiment, the CPU scheduler advance the vcpu_progress of the VCPU by $2^n*\delta$ (guest_progress).

Techniques described herein, as compared to prior solutions, improve performance while ensuring skew remains within acceptable limits, particularly when applied to virtual machines having more than four virtual processors.

Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A method for managing skew between a plurality of virtual CPUs assigned to a virtual machine to execute threads of the virtual machine, the virtual machine being supported by a computer system having multiple physical processors (PCPUs), the method comprising:
   for each thread of the virtual machine, reducing a virtual time of the thread by a corun bonus, the virtual time being an accumulation of real time of executing the thread as modified by a weight assigned to the thread and the corun bonus being a measure of a number of virtual CPUs assigned to the virtual machine that are running on different PCPUs; and
   granting execution priority to one of the threads that has the lowest virtual time.

2. The method of claim 1, wherein an amount of corun bonus is normalized by an amount of a CPU entitlement associated with a virtual CPU.

3. The method of claim 1, further comprising:
   calculating a skew between a first virtual CPU and a second virtual CPU based on a difference in progress of the first and second virtual CPUs, wherein progress of a virtual CPU is updated based on a measure of time during which that virtual CPU is executing guest code; and
   performing a scheduling operation on the first virtual CPU based at least in part on the calculated skew.

4. The method of claim 3, wherein performing the scheduling operation on the first virtual CPU based at least in part on the calculated skew further comprises descheduling the first virtual CPU from executing based on the skew between the first virtual CPU and the second virtual CPU exceeding a threshold amount of skew.

5. The method of claim 3, further comprising:
calculating a metric as a function of the calculated skew; and
adjusting the progress of the second virtual CPU by an amount that is a function of the metric, adjusting the progress being performed only when the calculated skew exceeds a threshold amount of skew.

6. A non-transitory computer-readable storage medium comprising instructions that, when executed in a computing device, manage skew between a plurality of virtual CPUs assigned to virtual machine to execute threads of the virtual machine, the virtual machine being supported by a computer system having multiple physical processors (PCPUs), by performing the steps of:
for each thread of the virtual machine, reducing a virtual time of the thread by a corun bonus, the virtual time being an accumulation of real time of executing the thread as modified by a weight assigned to the thread and the corun bonus being a measure of a number of virtual CPUs assigned to the virtual machine that are running on different PCPUs; and
granting execution priority to one of the threads that has the lowest virtual time.

7. The non-transitory computer-readable storage medium of claim 6, wherein an amount of corun bonus is normalized by an amount of a CPU entitlement associated with a virtual CPU.

8. The non-transitory computer-readable storage medium of claim 6, wherein the instructions, when executed in the computing device, perform the steps comprising:
calculating a skew between a first virtual CPU and a second virtual CPU based on a difference in progress of the first and second virtual CPUs, wherein progress of a virtual CPU is updated based on a measure of time during which that virtual CPU is executing guest code; and
performing a scheduling operation on the first virtual CPU based at least in part on the calculated skew.

9. The non-transitory computer-readable storage medium of claim 8, wherein the instructions, when executed in the computing device, perform the steps comprising:
calculating a metric as a function of the calculated skew; and
adjusting the progress of the second virtual CPU by an amount that is a function of the metric, the adjusting of the progress being performed only when the calculated skew exceeds a threshold amount of skew.

10. A computer system, the computer system comprising:
a memory; and
a plurality of physical processors (PCPUs) on which a plurality of virtual CPUs are running, the virtual CPUs being assigned to a virtual machine to execute threads of the virtual machine, the virtual machine being supported by the plurality of PCPUs,
wherein at least one of the plurality of PCPUs is programmed to carry out the steps of:
for each thread of the virtual machine, reducing a virtual time of the thread by a corun bonus, the virtual time being an accumulation of real time of executing the thread as modified by a weight assigned to the thread and the corun bonus being a measure of a number of virtual CPUs assigned to the virtual machine that are running on different PCPUs; and
granting execution priority to one of the threads that has the lowest virtual time.

11. The computer system of claim 10, wherein an amount of corun bonus is normalized by an amount of a CPU entitlement associated with a virtual CPU.

12. The computer system of claim 10, wherein the at least one of the plurality of PCPUs is further programmed to carry out the steps of:
calculating a skew between a first virtual CPU and a second virtual CPU based on a difference in progress of the first and second virtual CPUs, wherein progress of a context is updated based on a measure of time during which that context is executing guest code; and
performing a scheduling operation on the first virtual CPU based at least in part on the calculated skew.

13. The computer system of claim 12, wherein performing the scheduling operation on the first virtual CPU based at least in part on the calculated skew further comprises descheduling the first virtual CPU from executing based on the skew between the first virtual CPU and the second virtual CPU exceeding a threshold amount of skew.

14. The computer system of claim 12, wherein the at least one of the plurality of PCPUs is further programmed to carry out the steps of:
calculating a metric as a function of the calculated skew; and
adjusting the progress of the second virtual PCU by an amount that is a function of the metric, the adjusting of the progress being performed only when the calculated skew exceeds a threshold amount of skew.

* * * * *